2,052,970

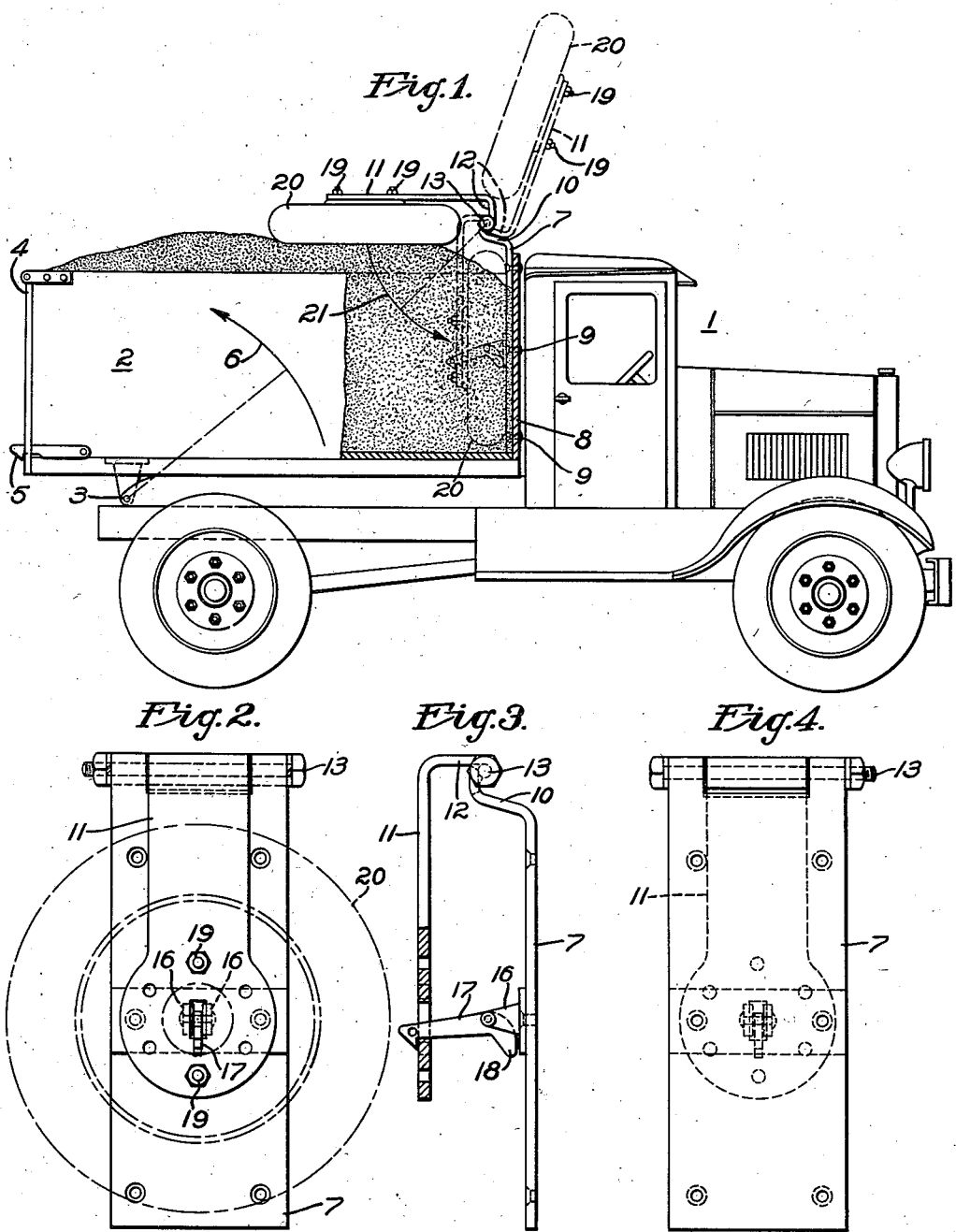
Sept. 1, 1936. F. E. ERBECK 2,052,970
SPARE WHEEL OR TIRE CARRIER
Filed June 13, 1934 2 Sheets-Sheet 1
INVENTOR
Frank E. Erbeck.
BY
Paul E. Friedemann
ATTORNEY Sept. 1, 1936.  F. E. ERBECK  2,052,970
SPARE WHEEL OR TIRE CARRIER
Filed June 13, 1934  2 Sheets-Sheet 2
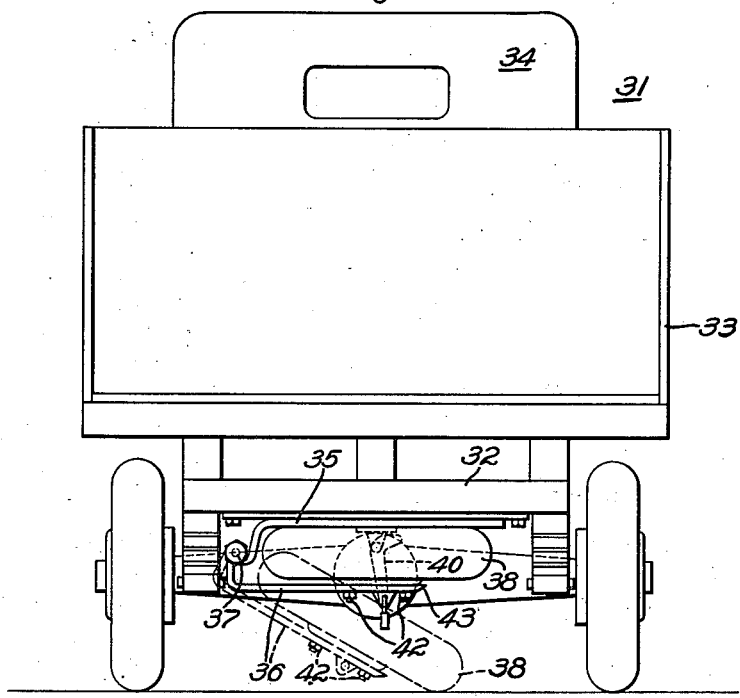
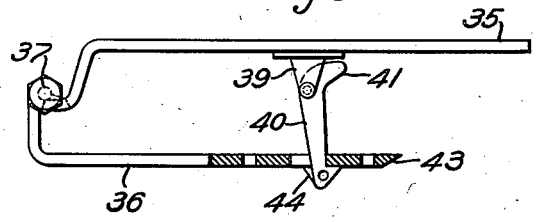 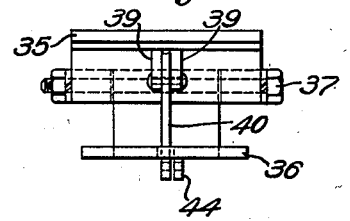
INVENTOR
Frank E. Erbeck.
BY
Paul E. Friedermann
ATTORNEY Patented Sept. 1, 1936

UNITED STATES PATENT OFFICE 2,052,970

SPARE WHEEL OR TIRE CARRIER

Frank E. Erbeck, Homestead, Pa.

Application June 13, 1934, Serial No. 730,428

7 Claims. (Cl. 224—29)

This invention relates to improvements in tire carriers, more particularly to tire carriers or spare wheel carriers utilized on dump trucks and express trucks.

On dump trucks it is very inconvenient to carry a spare wheel or tire underneath the truck because there is no space available for ready access to the tire. Furthermore the space at the back and beneath the truck must be occupied by the mechanisms for actuating the devices for dumping the truck.

Further the place the spare wheel or tire in a well on the fender is not a satisfactory position for the spare wheel because, particularly for trucks, the spare wheel is of considerable weight and as a consequence the fenders and also the frame structure for holding the fenders breaks down. This disadvantage is obviously much more serious for trucks than any other kind of automotive vehicle, since trucks are often called upon to travel over rough unimproved roads and sometimes are called upon to travel over regions not laid out as roads.

The devices heretofore used for express trucks are also not satisfactory because the positioning of the spare wheel or spare tire on the devices heretofore utilized is very difficult since the spare wheels are of a considerable weight and therefore to position such spare wheel into an inconvenient place sometimes requires the services of three men.

One object of my invention is to provide a tire or wheel carrier which permits the ready removal of the spare wheel or spare tire from the holder with a minimum amount of effort and also provide for a convenient and easy replacement of the spare wheel or tire on the carrier.

Another object of my invention is to provide a hinged structure at the front portion of a dump truck which permits the movement of the tire out of the region to be occupied by the load and after the truck is loaded to carry the tire on the load.

A broad object of my invention is to provide a hinged structure one element of the hinge being rigidly secured to the truck and the other element being adapted to move the wheel to such a position that it may be readily removed and replaced without requiring the services of more than one man.

A further object of my invention is to provide a hinged structure below the load carrying compartment of an express truck which hinged structure has one element secured to a frame portion of the truck and the other element adapted to swing in a plane transverse to the longitudinal direction of the truck, or in other words, the axis of the hinge is in line with the longitudinal direction of the truck, or at right angles to the rear axle of the truck.

Other objects and advantages of my invention will become apparent from a study of the following specification when taken in conjunction with the following drawings, in which:

Fig. 1 is a side view of a dump truck with certain parts in section to more clearly show some of the features of my invention;

Fig. 2 is a rear view of the subject matter of my invention showing the spare wheel, in dotted line, in position on the rear hinged member;

Fig. 3 is a side view partly in section of the subject matter of my invention showing the latching arrangement, and showing the subject matter without a spare wheel mounted thereon;

Fig. 4 is a front view of my invention showing the hinged member adapted to be rigidly secured to the truck in full line and the rear or pivoted member in dotted line;

Fig. 5 is a rear view of an express truck provided with the features of my invention;

Fig. 6 is a side view, certain parts being in section, of the subject matter of my invention as adapted to an express truck, and;

Fig. 7 is an end view of the subject matter shown in Fig. 6.

Referring more particularly to Fig. 1 of the drawings, I generally designates a truck, namely a dump truck, wherein the load compartment or body 2 is adapted to move or pivot about a pivot or hinge 3 so that the load may be discharged at the rear when the door 4 is in open position, by the release of the latch 5. The mechanisms for moving the body 2 in the direction indicated by the arrow 6 may be any suitable mechanisms, which mechanisms do not constitute part of my invention. At the front end of the body 2 a plate member 7 is rigidly secured to the end gate or end member 8 by means of retaining bolts, or, for that matter, rivets 9. The member 7 has an upper portion bent rearwardly as shown at 10, which rearwardly bent portion or ledge provides a rest for the member 11 at the portion 12 bent at right angles to the general direction of the pivoted member 11. A pivot pin or bolt 13 interconnects the members 7 and 11 in the manner shown.

The member 7, bolted to the end portion 8 of the body 2, is provided with a pair of lugs 16. Pivotally mounted between the lugs 16 is a latch member 17, provided with a weighted portion 18 which is adapted to release the pivoted member 11 to cause it to swing in a clockwise direction (see Figs. 1 and 3) when the member 11 is first pressed or rotated slightly in the counter-clockwise direction. In other words the weighted portion 18 overbalances the longer portion of the latch member 17 thus swinging the latch member 17 in a clockwise direction to release the pivotally mounted member 11. In place of a weight 18, any other means as for instance a spring may be used to actuate the latch member 17. The spare wheel is suitably secured to the member 11 by the bolts and screws 19.

When the truck is empty, that is when there is no load in the body 2, the spare wheel will be disposed in the vertical position as shown by the dotted lines in Fig. 1, and when the truck is to be loaded, the latch member 17 may be released by first withdrawing any locking member that may be disposed through the apertures in the latch member 17, and a lug on member 11 that may cooperate therewith. The pivotally mounted member 11 is thereupon rotated slightly in a counter-clockwise direction thereby permitting the latch member 17 to rotate in a clockwise direction to release the member 11. The spare tire and the pivoted member 11 may thus be thrown into the uppermost position shown in Fig. 1 by a clockwise rotation of the member 11 on the bolt or pivot member 13. The spare tire 20 thus in no wise interferes with the loading of the truck, and the weight of the spare wheel is taken by the ledge portion 10 hereinbefore mentioned.

After the truck is loaded the spare wheel is dropped down on the load, as shown in full line, which load may be coal, or earth, or any other material such as is commonly hauled by dump trucks and which does not injure the spare wheel, nor is being injured by the spare wheel. After the load has been taken to its point of destination the dumping mechanism is actuated in any suitable manner and the body 2 is moved in a counter-clockwise direction indicated by the arrow 6 and the load is thus dumped where needed. Of course, it is clear that the door 4 will be, in this case, disengaged from the latch 5.

As the load flows out of the body the spare wheel moves in a counter-clockwise direction, as indicated by the arrow 21, and thus in no wise interferes with the discharge of the load. When the load has been emptied the body 2 is returned to the position shown in Fig. 1 and the spare wheel thus hangs in a vertical position, as shown in broken lines in Fig. 1. The latch member 17 may thus be caused to engage the member 11 and any securing means may be used to prevent any pendulous action of the spare wheel during the movement of the truck back to its loading place.

From the foregoing description it will be apparent that my device consists of a minimum number of parts and provides a spare wheel carrier that is always in a position where the spare wheel may be readily taken off the carrier without requiring the assistance or the cooperation of several men. It is obviously not difficult to remove the spare wheel from the member 11 regardless of whether the truck be full or empty, nor is it difficult to replace the spare wheel on the member 11, since such repositioning merely requires the positioning of the wheel between the members 7 and 11 and the application or insertion of the bolts 19.

My invention is also readily applicable to an express truck as shown in Fig. 5. The express truck is generally designate by a reference character 31, whereas the subject matter of my invention is now shown as mounted to a frame member 32 positioned below the load receiving compartment 33 transverse of the truck 31. In an express truck it is of course not desirable to let the spare wheel rest on the load, nor is the body designed to move about a pivot point as in a dump truck. It is thus of course desirable that the spare wheel be placed in some position on the truck where it can be readily removed from the carrier and also readily replaced on the carrier.

With tire carriers for express trucks heretofore known to applicant, provision was either made for receiving the tire on the fender, a very unsatisfactory place for mechanical reason, or in a space intermediate the body and the cab, which latter position is not desirable because very valuable freight or load receiving space is occupied by the spare wheel.

Still other carriers known to applicant provide for a non-movable frame structure underneath the body so that the truck driver, when he wishes to replace a tire on the carrier, has to lift the entire spare wheel into a horizontal position to the plane of the carrier and then push it into the rack. This obviously requires either a man of huge strength or several men because spare tires as well as spare wheels for trucks are of considerable weight. Furthermore, when the spare wheel is to be removed, the truck driver would have to crawl under the truck to unlock the locking members or unbolt the retaining members and thereafter withdraw the spare wheel.

My invention obviously eliminates all these disadvantages, namely, the frames of the fenders nor the fenders themselves are injured, nor is valuable freight receiving space occupied by the tire, and further the carrier is so positioned with reference to the longitudinal axis of the truck that ready access may be had to the locking devices and to the bolts for retaining the spare wheel on a pivotally mounted member hereinafter more specifically referred to.

Referring more particularly to Figs. 5, 6, and 7, it will be noted that a horizontal member 35 is rigidly secured to the horizontally disposed frame member 32 and a pivoted member 36 is hinged to the member 35 at the pivot bolt of pin 37. Both the members 35 and 36 are bent in such a manner at the left hand ends thereof so as to provide a suitable space intermediate these members, when partially disposed, to receive the spare wheel 38.

The member 35 is provided with a pair of lugs 39 pivotally carrying a latch member 40 provided with a weight 41 for causing the latch member to rotate in a clockwise direction to release the member 36 when the spare wheel 38 is to be removed from the member 36. It is an important feature of my invention that the axis of the hinge pin 37 of the two hinged members 35 and 36 is disposed longitudinally of the truck. After the latch member 40 has thus been released, the member 36 and the tire 38 will be disposed in the dotted line position shown in Fig. 5, with a side portion of the circumference of the tire resting on the ground. The bolts 42 may thus be readily removed to disengage the spare wheel 38 and in addition there is considerable room for moving the spare wheel backwardly out of engagement with the carrier and from under the truck. The lower portion in contact with the ground operates as the surface of rotation for the tire. At no time, therefore, regardless of whether the tire is being removed from the carrier or being mounted on the carrier is it necessary to lift the spare wheel from the ground. Merely a backward rotation for removal or a forward rotation for replacement is necessary, at the same time the bolts 42 can be readily replaced as well as taken out of the carrier.

The latch member 40 is adapted to pass through an aperture in the member 36 and cooperates with a single lug 44. The use of a single lug 44 is an advantage because any mud or other foreign material does not jam the latch 40.

It will be apparent from a mere inspection of the lower portion of Fig. 5 how much more convenient, much more simple, and much more efficient my carrier is than any rack that may be positioned underneath the truck and require that the entire spare wheel, or tire, be lifted to a horizontal position to be inserted within the rack. Further a member, even if pivotally mounted at the back or underneath the truck would not be as convenient as the members I have shown if such pivotally mounted member has its axis transverse of the longitudinal direction of the truck regardless of whether this axis be near the rear end of the truck or positioned farther towards the front.

If positioned near the rear end and transverse of the truck the pivoted member that may engage the spare wheel would interfere with the removal of the spare wheel and further would be in such a position to be very readily damaged, if it should become disengaged and the truck be moved in a forward direction. On the other hand if the axis of the pivoted portion be transverse of the truck and remote from the rear end of the truck no ready access would be had to the bolts for securing the spare wheel on the pivoted member. Further if the pivoted member become disengaged and the truck be moved backwardly the tire carrier would be completely damaged.

With the disposition of the members 35 and 36 as shown in Figs. 5 and 6 none of these disadvantages or dangers result and further if the truck be moved either forwardly or backwardly the end portion of the pivoted member 36 will merely slide on the ground. To facilitate such sliding action the end is cut away as indicated at 43 to provide an arcuate engaging surface with the ground.

As shown in Fig. 5, the left hand end portion of the member 36 engages a frame portion of the truck and is actually held somewhat above the surface of the ground regardless of whether the spare wheel 38 be in the position shown by the broken line in Fig. 5 or whether no spare wheel be in the carrier at all.

I am fully aware of the fact that others skilled in the art, after having had the benefits of the teachings of my invention, can devise other carriers, possibly somewhat similar to the carrier hereinbefore disclosed, for accomplishing the novel results I have set out. I do not wish to be limited however, to the specific showing made, but I wish to be limited only by the scope of the appended claims as such scope may be determined by pertinent prior art.

I claim as my invention:

1. A carrier for tires or spare wheels, in combination, a dump truck, a member disposed transverse of the front portion of the load receiving compartment, a flat bar member disposed vertically of said transverse member rigidly secured to the transverse member, said member having an upper end portion extending at an angle to the member to thus form a horizontal ledge, a second flat bar member, said second member having a portion extending at an angle thereto, said two flat members being pivotally secured to each other at the bent portions whereby the second member may be moved in a vertical plane about a horizontal axis and the extending portion of the second member may be made to rest on the horizontal ledge, and means disposed adjacent the end of the second member to hold a spare wheel, or tire, whereby said spare wheel, or tire, is held between said flat members.

2. A carrier for tires or spare wheels, in combination, a dump truck, a member disposed transverse of the front portion of the load receiving compartment, a flat bar member disposed vertically of said transverse member rigidly secured to the transverse member, said member having an upper end portion extending at an angle to the member to thus form a horizontal ledge, a second flat bar member, said second member having a portion extending at an angle thereto, said two flat members being pivotally secured to each other at the bent portions whereby the second member may be moved in a vertical plane about a horizontal axis and the extending portion of the second member may be made to rest on the horizontal ledge, means disposed adjacent the end of the second member to hold a spare wheel, or tire, whereby said spare wheel, or tire, is held between said flat members, and latching means adapted to hold said flat members in spaced relation to each other.

3. A carrier for tires, or spare wheels, in combination, a truck; a supporting structure secured to the truck, a substantially bar-like member rigidly secured to the structure and having an end portion extending at an angle to said member, and a pivot at the end of the portion extending at an angle to said member; a second substantially bar-like member substantially half the length of the first named member having an end portion extending at an angle to the main portion thereof, and means at the extending portion of this second member for pivotally engaging the pivot at the end of the extending portion of the first member whereby a space is provided between said members when parallelly disposed for receiving a spare tire, or spare wheel; a spare tire, or spare wheel, disposed between said members; and means, disposed near the free end of the second member, adapted to secure the said spare tire, or spare wheel, disposed between said member to said second named member, whereby said tire, or wheel, may be moved with said second named member when operated on the pivotal engagement of the members.

4. A carrier for tires, or spare wheels, in combination, a truck; a supporting structure on said truck disposed transverse of said truck; a member rigidly secured to the structure and having and end portion extending at an angle to said member and a pivot pin at the end of the portion extending at an angle to said member; a second member substantially half the length of the first named member also having an end portion extending at an angle to the main portion thereof; means at the extending portion of this second member for pivotally engaging the pin at the extending end portion of the first member whereby a space is provided between said members when parallelly disposed for receiving a spare tire, or wheel, therebetween; a spare tire, or wheel; means, disposed near the end of the second member, adapted to secure the spare tire, or wheel, to said second named member, whereby the spare tire, or wheel, may be moved with said second member; a latch adapted to automatically release said second member for pivotal movement with reference to the first named member upon a given movement of the second named member; and means for locking said latching member to said second named member whereby the second named member is held in a given position with reference to the first named member.

5. A carrier for tires, or spare wheels, in combination with the load receiving compartment of a dump truck, a substantially bar-like member rigidly secured to the end portion of the load receiving compartment adjacent to the cab of the truck and disposed in a vertical position and having the upper end portion thereof extending at an angle with reference to the member and a pivot at the end of the extending portion; a second member pivotally engaging said first member at the pivot, said second member having a shoulder near the pivot whereby said second member may be positioned to rest upon the portion of the first member extending at an angle to the first named member; a spare tire, or wheel; and means disposed near the end of the second member, adapted to secure the spare tire, or wheel, to said second named member and in parallel relation thereto, whereby the spare tire, or wheel, may be moved with said second named member.

6. A carrier for tires, or spare wheels, in combination with the load receiving compartment of a dump truck which is adapted to pivot about an axis transverse of the truck near the rear end thereof to dump the load, in combination, a bar-like member rigidly secured to the end portion of the load receiving compartment adjacent the cab, said bar-like member being disposed in a vertical position and having an end portion extending at an angle to said member, a pivot pin at the end of the portion extending at an angle to said member; a second bar-like member also having an end portion extending at an angle to the main portion thereof; means at the extending portion of the said second member for pivotally engaging the pin at the extending portion of the first named member, whereby the second named member may be supported in open or non-parallel position so that a tire or spare wheel may be positioned adjacent the first named member and whereby a space is provided between said members when parallelly disposed for receiving a spare tire, or wheel; means, disposed adjacent the end of the second member, adapted to secure the spare wheel, or tire, to said second member, whereby the tire, or wheel, will move with said second named member; latch means adapted to automatically release said second named member for pivotal movement with reference to said first named member upon a given movement of the second named member; and means for locking said latch means to said second member whereby the members are held in fixed relation to each other.

7. A carrier for tires, or spare wheels, in combination, a truck, a support on said truck; a bar-like member rigidly secured to said support and having an end portion extending at an angle to said member, a pivot at the end of the portion extending at an angle to said member; a second member having an end portion also extending at an angle to the main portion thereof; means at the extending portion of this second member for pivotally engaging the end of the extending portion of the first named member; whereby a space is provided between said members, when parallelly disposed, for receiving a spare tire, or wheel, and whereby the two extending portions are adapted to engage each other to provide a support for one of said members upon the other of said members when not parallelly disposed; a spare tire, or wheel; and means adapted to secure the spare tire, or wheel, to said second member, whereby the spare tire, or wheel, is movable with said second member to facilitate removal of the spare tire, or wheel.

FRANK E. ERBECK.